(12) United States Patent
Murata et al.

(10) Patent No.: US 7,835,252 B2
(45) Date of Patent: Nov. 16, 2010

(54) OPTICAL HEAD APPARATUS

(75) Inventors: Koichi Murata, Tokyo (JP); Yoshiharu Ooi, Tokyo (JP)

(73) Assignee: Asahi Glass Company, Limited, Tokyo (JP)

( * ) Notice: Subject to any disclaimer, the term of this patent is extended or adjusted under 35 U.S.C. 154(b) by 714 days.

(21) Appl. No.: 11/734,535

(22) Filed: Apr. 12, 2007

(65) Prior Publication Data

US 2008/0253265 A1 Oct. 16, 2008

(51) Int. Cl.
G11B 7/135 (2006.01)
(52) U.S. Cl. .................................. 369/112.19
(58) Field of Classification Search ............. 369/112.19
See application file for complete search history.

(56) References Cited

U.S. PATENT DOCUMENTS 5,013,141 A * 5/1991 Sakata ........................ 349/201
5,594,713 A * 1/1997 Komma et al. ............ 369/44.23

FOREIGN PATENT DOCUMENTS

| JP | 4-283430 | 10/1992 |
| JP | 9-282684 | 10/1997 |
| JP | 09282684 A | * 10/1997 |
| JP | 2000-132854 | 5/2000 |
| JP | 2000-348375 | 12/2000 |
| JP | 2001-141992 | 5/2001 |
| JP | 2001-290017 | 10/2001 |
| JP | 2001-319367 | 11/2001 |
| JP | 2002-372611 | 12/2002 |
| JP | 2003-45065 | 2/2003 |
| JP | 2003-217166 | 7/2003 |
| JP | 2005-63571 | 3/2005 |
| JP | 2006-99946 | 4/2006 |
| JP | 2006-99947 | 4/2006 |

* cited by examiner

*Primary Examiner*—Joseph H Feild
*Assistant Examiner*—Nicholas Lee
(74) *Attorney, Agent, or Firm*—Oblon, Spivak, McClelland, Maier & Neustadt, L.L.P.

(57) ABSTRACT

An optical head apparatus includes a light source and an objective lens focusing a light source light on an optical recording medium. Also included is a light detector receiving a return light, and a variable diffraction device including a first polarized light diffraction grating; and a second polarized light diffraction grating. Provided that a polarizing direction diffracted by the first polarized light diffraction grating is defined as a first polarizing direction and a polarizing direction that is orthogonal to the first polarizing direction and not diffracted by the first polarized light diffraction grating is defined as a second polarizing direction, a ratio obtained from dividing a diffraction efficiency in the second polarizing direction by a diffraction efficiency in the first polarizing direction, of the first polarized light diffraction grating, is 0 to 0.5, and a ratio obtained from dividing a diffraction efficiency in the first polarizing direction by a diffraction efficiency in the second polarizing direction, of the second polarized light diffraction grating, is 0 to 0.5.

7 Claims, 7 Drawing Sheets

(a)

(b)

OPTICAL HEAD APPARATUS

FIELD OF THE INVENTION

The present invention relates to an optical head apparatus necessary for switching diffraction gratings when the reading and writing of information is carried out with respect to an optical recording medium (hereinafter referred to as optical disk) such as CD, DVD, etc.

BACKGROUND OF THE INVENTION

There has been heretofore disclosed a technique that, in the case where the reading and writing of information is carried out with respect to optical disks having different standards for the track pitch on the information recording surface, electrodes respectively having two different electrode patterns are used, then voltages of different space patterns are applied to a liquid crystal, and different diffraction gratings are formed, in order to avoid providing a plurality of diffraction gratings in an optical head apparatus (for example, refer to references 1 and 2).

In the case of the liquid crystal diffracting device disclosed in the reference 1, transparent electrodes 73a, 73b each having a different electrode pattern formed on a transparent substrate 71 are used by switching the electrodes one another. A voltage is then applied to either the transparent electrode 73a or 73b and to a transparent electrode 74 formed on a transparent substrate 72 as oppositely disposed to the transparent electrodes. In this way, a different voltage of the space pattern is made applied to a liquid crystal 75. Incidentally, the transparent electrode 73a is insulated from the transparent electrode 73b. The switching for the transparent electrodes 73a and 73b is carried out by an applied-voltage switching means 76. As a result, the liquid crystal diffracting device realizes diffraction gratings corresponding to the electrode pattern of either the transparent electrode 73a or 73b to which the voltage is applied by the applied-voltage switching means 76.

On the other hand, a diffraction grating disclosed in the reference 2 has two liquid crystal display units. A stripe shaped transparent electrode is formed on each of the liquid crystal display units. The voltage applied liquid crystal display unit is functioned as a diffraction grating. The non-voltage applied liquid crystal display unit is made functioned as a transparent flat plate. The liquid crystal display unit to be applied a voltage is switched so that the diffraction grating is made switched.

Further, a diffraction grating disclosed in a reference 3 includes two transparent substrates formed of electrode patterns alternately configured one another, and a liquid crystal layer held between the transparent substrates. A voltage is switched to one another and applied to one of electrodes, as a set, alternately configured one another, so that a different voltage of space pattern is applied to the liquid crystal layer, and a diffraction grating pattern is switched.

[Reference 1] JP-A-4-283430
[Reference 2] JP-A-9-282684
[Reference 3] JP-A-2006-99947

However, in the case of the optical head apparatus provided with liquid crystal diffraction gratings of such a related art, there are two electrodes in which one is applied with a voltage and the other is not (for example, transparent electrodes 73a and 73b in the constitution shown in FIG. 7). In this case, there has been a problem that the liquid crystal diffraction gratings are susceptible to the static electricity etc. since the electrode not being applied with any voltage is electrically floated, characteristic variation caused by the time lapse occurs easily. Further, there has been problem that the liquid crystal diffraction gratings as related art requires at least three terminals used for applying voltages, so that a driving circuit is made complicated and cost-cutting is limited.

SUMMARY OF THE INVENTION

The present invention has been made to solve the foregoing problems and provides an optical head apparatus capable of eliminating an electrically floated electrode, reducing characteristic variation caused by time lapse and the influence of static electricity, and reducing the number of voltage applied terminals to two.

An optical head apparatus of the invention comprises: a light source emitting a linearly-polarized light; an objective lens focusing a light source light emitted from the light source on an optical recording medium; a light detector receiving a return light generated by reflecting the light source light by the optical recording medium; and a variable diffraction device comprising: a first polarized light diffraction grating; and a second polarized light diffraction grating, the variable diffraction device: diffracting an incident light of the linearly-polarized light by one of the first polarized light diffraction grating and the second polarized light diffraction grating; and transmitting the incident light without diffraction by the other thereof, the first polarized light diffraction grating having: first stripes comprising an anisotropic transparent material; and second stripes comprising an isotropic transparent material, the first stripes and the second stripes being alternately arranged in a first direction and in a first pitch to fill each space; the second polarized light diffraction grating having: third stripes comprising an anisotropic transparent material; and fourth stripes comprising an isotropic transparent material, the third stripes and the fourth stripes being alternately arranged in a second direction and in a second pitch to fill each space; the first polarized light diffraction grating and the second polarized light diffraction grating being different in at least one of the pitches and the directions, the variable diffraction device being capable of switching: either the first polarized light diffraction grating or the second polarized light diffraction grating diffracting the incident light; and the other thereof transmitting the incident light without diffraction by changing refractive indices sensed by the first polarized light diffraction grating and the second polarized light diffraction grating with respect to the incident light by an externally applied electric signal.

According to the foregoing constitution, a diffraction pattern can changed by switching the electric signal applied by the variable diffraction device, and it is not necessary to switch the electrodes to be applied the electric signal, so that an electrically floated electrode can be eliminated, and a time lapse variation caused by an influence of static electricity can be improved.

Further, in the optical head apparatus of the invention, wherein the variable diffraction device includes a polarized light changing element and a polarized light diffracting element, the polarized light changing element comprises: a pair of transparent substrates oppositely arranged each other; transparent electrodes formed on opposed surfaces of the pair of transparent substrates; and a liquid crystal layer held between the transparent substrates, the polarized light changing element emits a light so that an incident light of linearly-polarized light incident thereto is either rotated by 90 degrees or is not changed in relation to the externally applied electric signal, optical axes of the first stripes and the third stripes are present in a plane of the polarized light diffracting element and define an angle of 90 degrees, the second stripes and the fourth stripes both have a refractive index substantially equal to an ordinary refractive index or an extraordinary light diffraction index of both of the first stripes and the third stripes.

Further, in the optical head apparatus of the invention, the polarized light changing element changes an orientation state of liquid crystal molecules in the liquid crystal layer to: a twisted orientation state where the liquid crystal molecules are aligned in parallel with the polarizing direction of the incident light at proximity of the transparent substrate located on a side to which the incident light is incident and aligned orthogonally to the polarizing direction of the incident light at proximity of the transparent substrate located on a side from which the incident light is emitted to the polarizing diffraction device; or a state where the liquid crystal molecules are perpendicularly oriented with respect to the surfaces of the transparent substrates by the externally applied electric signal.

Further, in the optical head apparatus of the invention, a product Δn·d obtained by multiplying a difference Δn between the ordinary refractive index and the extraordinary refractive index of a liquid crystal constituting the liquid crystal layer and a thickness d of the liquid crystal layer is an odd number times the a half wavelength of the incident light, and the polarized light changing element changes an orientation state of liquid crystal molecules in the liquid crystal layer to: a state where the liquid crystal molecules are oriented in parallel with the surfaces of the transparent substrates and at an angle 45 degrees with respect to the polarizing direction of the incident light; and a state where the liquid crystal molecules are perpendicularly oriented to the surfaces of the transparent substrates by the externally applied electric signal.

Further, in the optical head apparatus of the invention, the first stripes and the third stripes comprise a liquid crystal layer, and the liquid crystal layer is enable to change a refractive index with respect to the incident light from a first refractive index $n_b$ to a second refractive index $n_a$ by the externally applied electric signal, and the second stripes have a refractive index of $n_b$ to $(n_b+0.4 \times \Delta n)$ at a room temperature, and the fourth stripes have a refractive index of $(n_a-0.4 \times \Delta n)$ to $(n_a-0.1 \times \Delta n)$ at room temperature, provided that $n_a$ is larger than $n_b$ and a difference between the second refractive index $n_a$ and the first refractive index $n_b$ is defined as $\Delta n$.

According to the foregoing constitution, a diffraction pattern can be switched to one another by switching the electric signal applied by the variable diffraction device. Further, it is not necessary to switch the electrode to be applied the electric signal, so that an electrically floated electrode is eliminated. Therefore, a time lapse variation caused by the influence of static electricity can be improved, and a good characteristic can be maintained even though the ambient temperature is varied.

Further, in the optical head apparatus of the invention, provided that a polarizing direction diffracted by the first polarized light diffraction grating is defined as a first polarizing direction and a polarizing direction that is orthogonal to the first polarizing direction and not diffracted by the first polarized light diffraction grating is defined as a second polarizing direction, a ratio obtained from dividing a diffraction efficiency in the second polarizing direction by a diffraction efficiency in the first polarizing direction, of the first polarized light diffraction grating, is 0 to 0.5, and a ratio obtained from dividing a diffraction efficiency in the first polarizing direction by a diffraction efficiency in the second polarizing direction, of the second polarized light diffraction grating, is 0 to 0.5.

According to the foregoing constitution, if the variable diffraction device is arranged in an outward optical path and used for generating three beams to detect a tracking error, noise interference on a tracking servo can be reduced.

Further, in the optical head apparatus of the invention, a ratio obtained from dividing a zero-order diffraction efficiency by a primary-order diffraction efficiency, of the first polarized light diffraction grating with respect to the incident light having the first polarizing direction, is 5 to 30, and a ratio obtained from dividing the zero-order diffraction efficiency by the primary-order diffraction efficiency, of the second polarized light diffraction grating with respect to the incident light having the second polarizing direction, is 5 to 30.

According to the foregoing constitution, a noise to the tracking servo can be further reduced.

Further, in the optical head of the invention, the first pitch and the second pitch are 0.5 to 10 μm.

According to such constitution, a diffracted light by the variable diffraction device is largely deviated from the optical path, if the variable diffraction device is used for changing the light source light intensity irradiated on the optical disk with the emitted intensity of light source set to a constant, the adverse effect of a stray light can be reduce.

Further, in the optical head of the invention, an average thickness of the first transparent substrate and the second transparent substrate are not less than 100 times the thickness of the liquid crystal layer held between the first and the second transparent substrates.

According to the foregoing constitution, when the ambient temperature is changed, the deformation of the variable diffraction device changed to a shape of convex or concave lens, caused by a volume change of the liquid crystal layer having a large coefficient of thermal expansion, is restrained, so that the focused position displacement of luminous flux transmitted through the device can be restrained.

Further, in the optical head apparatus of the invention, the first pitch and the second pitch are different, and the optical head apparatus emits three beams consisting of a main beam and two sub-beams suitable for the optical recording media having a different track pitch by switching: either the first polarized light diffraction grating or the second polarized light diffraction grating diffracting the incident light; and the other thereof transmitting the incident light without diffraction by an externally applied electric signal.

According to the foregoing constitution, the three beams consisting of the main beam and two sub-beams can be switched, and an appropriately selected beam can be generated for the optical disks each having a different track pitch.

In the invention, the diffraction patter can be switched by switching the applied electric signal by the variable diffraction device. It is not necessary to switch the electrodes which apply the electric signal, so that an electrically floated electrode can be eliminated. Thus, a time lapse variation caused by the adverse effect of static electricity can be improved. A good grating cross-sectional configuration can be obtained by switching the diffraction pattern and a fine grating pitch can be set, therefore, a good diffraction characteristic is realized.

Figure 1:
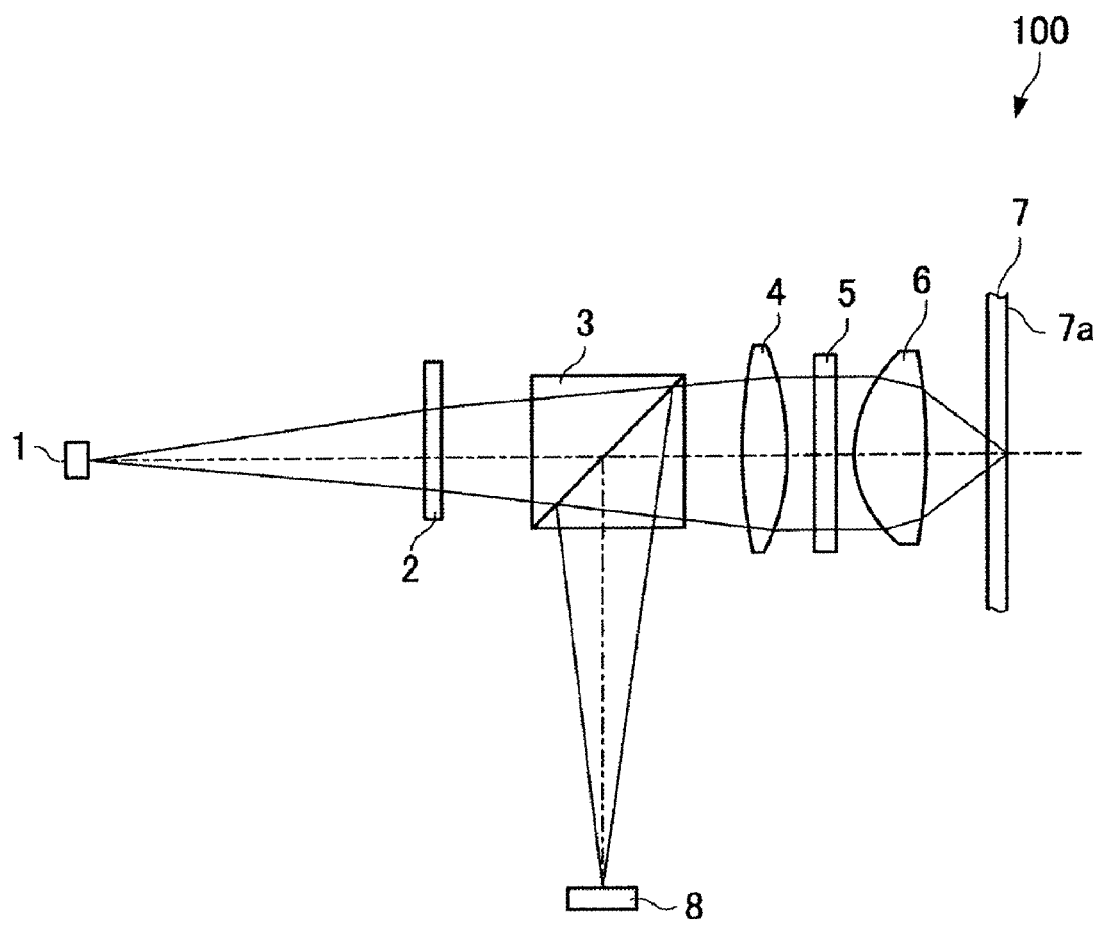
FIG. 1 is a constitutional diagram schematically showing an optical head apparatus in the first embodiment of the invention.

The reference numerals used in the drawings denote the followings, respectively.

1: light source
2, 2a, 2b1, 2b2: variable diffraction device
3: optical device (beam splitter)
4: collimator lens
5: aperture
6: objective lens
7: optical disk
7a: information recording surface
8: light detector
21, 22, 51a, 51b, 51c, 71, 72: transparent substrate
23, 24, 52a, 52b, 73a, 73b, 74: transparent electrode
25: first isotropic grating
26: second isotropic grating
27, 75: liquid crystal
28, 54: seal material
29, 55: flexible circuit board
53: polarizing liquid crystal
56, 57: anisotropic grating
58: grating material
70: liquid crystal diffracting element
76: applied voltage switching means
100: optical head apparatus
510: polarized light changing element
520: polarization diffracting element

DETAILED DESCRIPTION OF THE INVENTION

Hereinafter, embodiments of the invention will be explained with reference to the drawings.

First Embodiment of a Variable Diffraction Device

Figure 2:
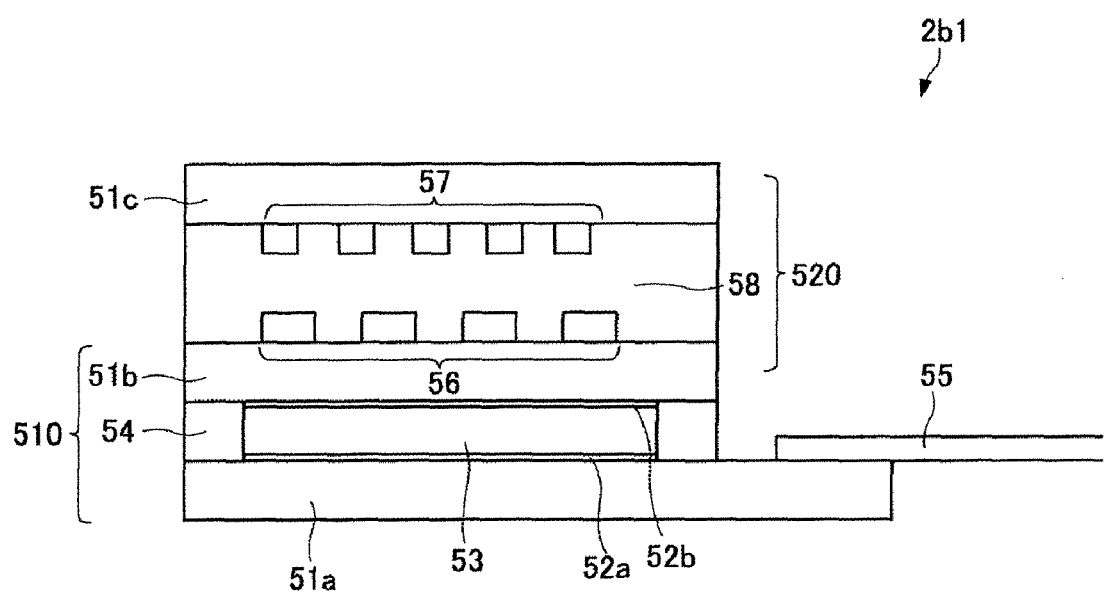
FIG. 2 is an example diagram showing a variable diffraction device integrated with a polarized light changing element and a polarization diffracting element.
Figure 3:
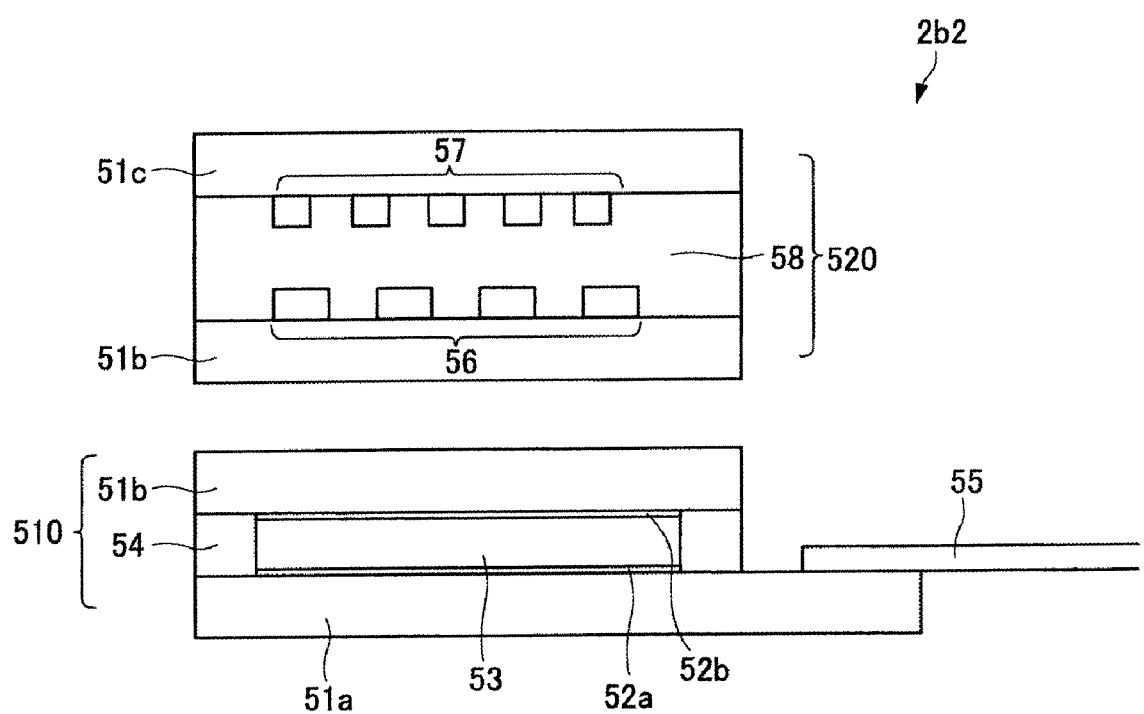
FIG. 3 is an example diagram showing a variable diffraction device separated from the polarized light changing element and the polarization diffracting element.

A variable diffraction device relative to the first embodiment of the present invention will be explained by using FIG. 2 and FIG. 3 that are schematically cross-sectional diagrams of a device constitution. FIG. 2 shows an example constituting a variable diffraction device integrated with a polarized light changing element and polarization diffracting element. FIG. 3 shows an example constituting a variable diffraction device separated from the polarized light changing element and the polarization diffracting element. The variable diffraction device shown in FIG. 2 is designated by a reference numeral 2b1, and the variable diffraction device shown in FIG. 3 is designated by a reference numeral 2b2.

Both the variable diffraction devices 2b1 and 2b2 shown in FIG. 2 and FIG. 3 have a polarized light changing element 510 and a polarization diffracting element 520, respectively.

The polarized light changing element 510 includes a pair of transparent substrates 51a, 51b; a liquid crystal layer 53 held between the pair of transparent substrates 51a and 51b; and a pair of transparent electrodes 52a, 52b for applying a voltage to the liquid crystal layer 53 formed on the pair of transparent substrates 51a, 51b. The peripheries of transparent substrates are sealed by a seal material 54. An electric signal is applied to the transparent electrodes 52a, 52b through a wiring of a flexible circuit board 55 to thereby apply a voltage to the liquid crystal layer 53, so that the orientation of liquid molecule is changed.

The transparent substrates 51a, 51b, 51c can be used of an organic material, for example, an acrylic-based resin, epoxy-based resin, vinyl chloride-based resin, polycarbonate resin, etc., but a glass material is desirable in consideration of the durability etc.

The transparent electrodes 52a, 52b are planar electrodes formed by depositing a conductive thin film made up of ITO, $SnO_2$, etc. on the surface of the transparent substrates 51a, 51b. The peripheries thereof are sometimes trimmed by the well-known photolithography and etching processing, and a leading electrode is formed, as required. The transparent electrodes 52a, 52b are formed in at least an optically effective entire area of the variable diffraction devices 2b1 and 2b2. An electric signal is supplied to the transparent electrodes 52a, 52b through the flexible circuit board 55 from a non-illustrated external power source, so that the voltage can be applied to the liquid crystal layer 53.

Incidentally, it is desirable that an insulation film is deposited on the surface of transparent electrodes 52a, 52b, which is however omitted from the constitutions shown in FIGS. 2 and 3. Further, it is desirable that an alignment film is deposited on a boundary face between the transparent electrodes 52a, 52b and the liquid crystal layer 53. The seal material 54 may be used of a hot-cured polymer, an ultraviolet curing resin, etc. of epoxy resin etc., and may also be mixed with a spacer such as a glass fiber by a few % in order to obtain a desirable cell interval. Hereinafter, a light is incident from the side of transparent substrate 51a and emitted from the side of transparent substrate 51b.

In the case of using the liquid crystal layer 53 constituting the polarized light changing element 510, it is desirable to use a twisted nematic liquid crystal, but not limited to use it. The thickness of first liquid crystal layer 53 is set to 5 μm, for example. Further, it is desirable that the respective surfaces of transparent substrates in contact with the liquid crystal layer 53 are applied by an orientation processing so that the orientation directions between each other are given at an angle with 90 degrees. Hereby, the directions of the liquid crystal molecules at an incident side and emission side thereof can be made in a condition of a twisted orientation which is twisted at an angle with 90 degrees, when the liquid crystal molecules are in the condition of horizontal orientation. That is, a non-illustrated electric signal switching means controls an electric signal toward the transparent electrodes 52a, 52b, so that the orientation of the liquid crystal layer 53 is switched to a condition where the liquid crystal molecules are aligned with the perpendicular and a condition where the liquid crystal molecules are made in the twisted orientation. As a result, an incident light of linearly-polarized light can be made transmitted without changing the polarizing direction, and transmitted with the polarizing direction changed at 90 degrees. The direction of the orientation processing, of the polarized light changing element 510, applied to the transparent substrate 51a to which a light source light is incident, is parallel with a polarizing direction (hereinafter, referred to as a first polarizing direction, and a polarizing direction orthogonal to the first polarization direction is referred to as a second polarizing direction) of the light source light which is the linearly-polarized light. The direction of the orientation processing is also parallel with a stripe direction of first polarized light diffraction gratings of the polarization diffracting element 520 which will be explained later. A direction of the orientation processing applied to the transparent substrate 51*b* is set to a direction orthogonal to the stripe direction of second polarized light diffraction gratings of the polarization diffracting element 520. As used the constitution explained above, an applied voltage to the liquid crystal layer 53 is controlled to change the orientation of liquid crystal molecules, so that the light source light incident to the polarized light changing element 510 can be emitted without changing the polarizing direction or with 90 degrees changed.

The polarized light changing element 510 may not be limited to use the foregoing constitution, but use other constitutions if the polarizing direction of the incident light can be changed at 90 degrees, and the following constitution may also be acceptable. In the descriptions, the meaning of "parallel" or "orthogonal" is not necessary to be strictly parallel or orthogonal, which may be in a range to be able to obtain the effect of the invention. A condition displaced from the parallel or orthogonal may also be acceptable.

That is, in the polarized light changing element 510, the directions of the orientation processing applied to the surfaces both in contact with the transparent substrates 51*a*, 51*b* and the liquid crystal layer 53 are set to an identical plane with the polarizing direction of the incident light and a direction at an angle with 45 degrees. The polarized light changing element 510 is also constituted so that a product Δn·d of the thickness d of liquid crystal layer 53 multiplied by a difference Δn between an ordinary refractive index and an extraordinary refractive index of the liquid crystal constituting the liquid crystal layer 53 becomes odd number times the half-wavelength of the incident light. As used the foregoing constitution, the electric signals applied to the transparent electrodes 52*a*, 52*b* are controlled so that the liquid crystal 53 can be made a horizontal orientation to act as a ½ wavelength plate, the polarizing direction of incident light can be rotated sometimes at 90 degrees and then emitted, and the incident light can be made a perpendicular orientation to be emitted without changing the polarizing direction. It is desirable that the product Δn·d is set to ½ times the incident light wavelength because of simple manufacturing and characteristic.

The polarization diffracting element 520 used in the variable diffraction device in the embodiment includes: a first transparent substrate 51*b* and second transparent substrate 51*c*; stripes (hereinafter, referred to as anisotropic gratings) 56, 57 made up of an anisotropic transparent material; and a stripe (hereinafter, referred to as an isotropic grating) 58 made up of an isotropic transparent material, which constitutes two polarized light diffraction gratings for diffracting an incident luminous flux according to the polarizing direction. Hereinafter, polarized light diffraction gratings formed by anisotropic gratings (hereinafter, referred to as first anisotropic gratings) 56 formed on the first transparent substrate 51*a* and the isotropic grating 58, is referred to as first polarized light diffraction gratings. Polarized light diffraction gratings formed by anisotropic gratings (hereinafter, referred to as second anisotropic gratings) 57 formed on the transparent substrate 51*b* and the isotropic grating 58, is referred to as second polarized light diffraction gratings.

The anisotropic gratings 56, 57 may be diffraction gratings both having a diffraction characteristic in response to the polarizing direction, and may also be used of a high molecular liquid crystal obtained by polymerizing and hardening a low molecular liquid crystal or liquid crystal composites, and a polarized light diffraction grating used with a form birefringent material such as $LiNbO_3$ etc. Particularly, using the high molecular liquid crystal, the control for the polarizing direction and diffracting direction becomes easy, which is desirable because the control of orientation direction is easy and the finishing of grating configuration is also easy. Hereinafter, the high molecular liquid crystal is used as the anisotropic gratings 56, 57.

Figure 4:
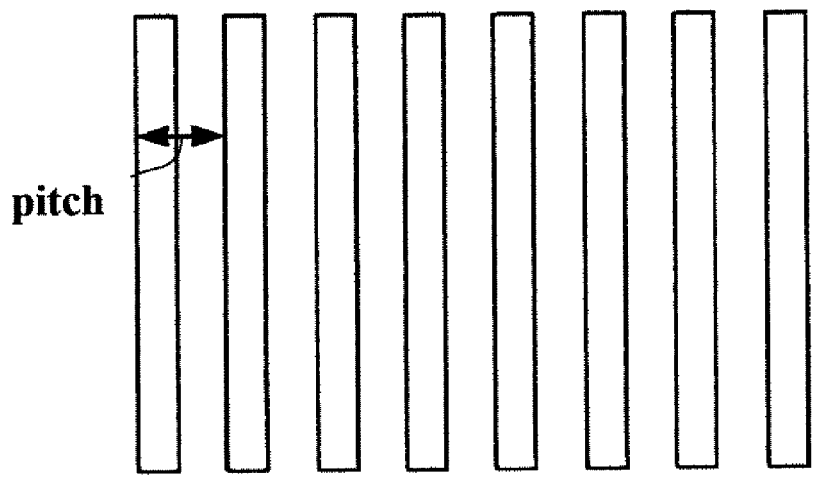
FIG. 4 is an explanatory diagram for explaining planar patterns of isotropic gratings 25, 26 formed on transparent electrodes 23, 24.
Figure 4:
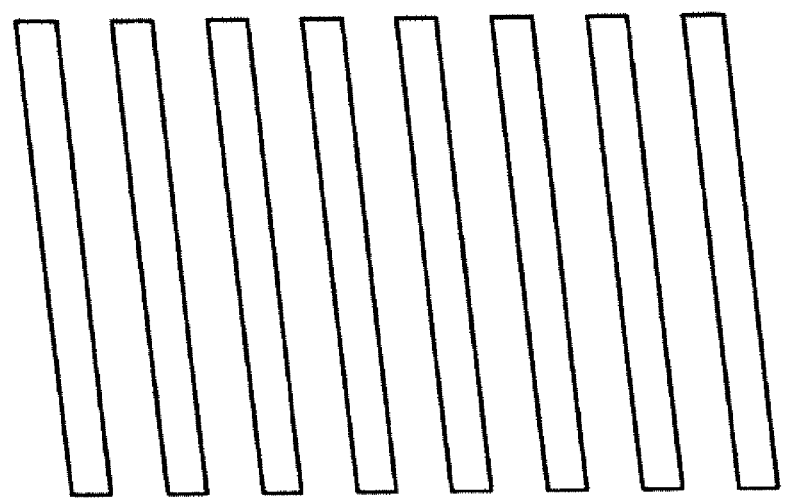

FIG. 4 shows conceptually a planar pattern of either the anisotropic grating or isotropic grating (hereinafter, simply referred to as grating) formed on the first transparent substrate 51*b* and second transparent substrate 51*c*. The grating formed on the first and second transparent substrates 51*b*, 51*c* (hereinafter, referred to as first grating and second grating, respectively) have the planar pattern of cyclically striped concavities and convexities, but have both a different planar pattern, respectively. That is, a first grating pattern shown in FIG. 4(*a*) and a second grating pattern shown in FIG. 4(*b*) have a predetermined angle (hereinafter, an opposed oblique angle) each other when the transparent substrates 51*b*, 51*c* are arranged and opposed one another, and their pattern cycle (hereinafter, referred to as a diffraction grating pitch) is different each other.

The opposed oblique angle between the first grating and second grating is set to a range from 0.2 to 5 degrees. If the opposed oblique angle is set to a range from 0.5 to 2.5 degrees, adjustment to the optical disks each having a different track pitch becomes easy, which is desirable.

The pitch of the first grating may be equal to that of the second grating, but may be different each other. It is desirable that the pitches are present in a range from 0.5 to 30 μm, and are different to each other.

An optical axis direction of the first anisotropic gratings 56 is parallel with the stripe direction of the first polarized light diffraction grating. An optical axis direction of the second anisotropic grating 57 is set so that it has an angle at substantially 90 degrees with the optical axis direction of first anisotropic grating 56. Therefore, the first anisotropic grating indicates the extraordinary refractive index, and the second anisotropic grating indicates the ordinary refractive index with respect to an incident light of the first polarizing direction.

The foregoing polarized light diffracting element can be fabricated by the following manner, as an example. First, the transparent substrates 51*b*, 51*c* made up of a transparent glass are provided. Non-illustrated alignment films are formed thereon, respectively. The orientation processing is applied to a direction parallel with the first polarizing direction which is the polarizing direction of the incident light to the variable diffraction devices 2*b*1, 2*b*2 and a direction orthogonal to the first polarizing direction. Subsequently, a high molecular liquid crystal layer having the foregoing orientation direction is formed. The high molecular liquid crystal layer is finished by the photolithography and etching process to form the first and second anisotropic gratings 56, 57 having desirable stripe directions and grating pitches.

Next, the transparent substrates 51*b*, 51*c* formed with the first and second anisotropic gratings 56, 57 made up of the high molecular liquid crystal are oppositely arranged to the grating forming surfaces thereof. A gap between the transparent substrates 51*b*, 51*c* is filled with the isotropic transparent material to fill in a space of the adjacent stripes between the anisotropic gratings 56, 57. This constitutes the isotropic grating 58 to form the first and second polarized light diffraction gratings, and cover the anisotropic gratings 56, 57 to put together with the transparent substrates 51*b*, 51*c*, so that the polarization diffracting element 520 can be obtained.

The isotropic grating 58 is made up of an isotropic transparent material which is optically isotropic and does not have substantially absorption with respect to a light wavelength to be used. In the case of isotropic transparent material, it is desirable that a material having a refractive index is equal to either the ordinary refractive index or the extraordinary refractive index of the optically anisotropic material constituting the first and second anisotropic gratings. The refractive index is equal in the description of the embodiment, which means that it is substantially equal, but there may be a difference from that if it is present in a range to be able to obtain the effect of the invention. The isotropic transparent material can be used as an isotropic medium, that is, a filling material. The filling material is of organic materials such as acrylic-base, epoxy-base, etc., and inorganic materials such as $SiO_2$, $SiO_xN_y$, etc., for example.

In the case where the refractive indices of the transparent substrates 51a, 51b are made equal to either the ordinary light refractive indices or the extraordinary light refractive indices of the anisotropic gratings 56, 57, a reflected loss at boundary face of the boards can be reduced, which is desirable. Hereinafter, a constitution example will be explained so that the refractive indices of the transparent substrates 51a, 51b and the isotropic grating 58 are made equal to the ordinary light refractive indices of the anisotropic gratings 56, 57. However, other constitutions can also be used so that the refractive indices of transparent substrates 51a, 51b are made equal to the ordinary refractive indices of the anisotropic gratings 56, 57, and also the refractive index of isotropic grating 58 is made equal to the extraordinary refractive indices of the anisotropic gratings 56, 57.

The light beam incident to the variable diffraction devices 2b1, 2b2 as the foregoing constitution is incident first to the polarized light changing element 510. An electric signal is applied to the polarized light changing element 510, so that the polarizing direction is controlled to either the first polarizing direction or the second polarizing direction, and the light beam is incident to the polarization diffracting element 520 as described above.

First, a case where the light beam incident to the polarized light changing element 510 is made its polarizing direction to be set to the first polarizing direction by the polarized light changing element 510 and is incident to the polarization diffracting element 520 will be discussed. The first anisotropic grating 56 of the first polarization diffracting element senses the extraordinary refractive index with respect to the linearly-polarized light of the first polarizing direction, therefore, there occurs a refractive index difference between the ordinary light refractive indices of the anisotropic gratings 56, 57 and the isotropic grating 58 being equal to that, so that the incident light is diffracted by the first polarized light diffraction grating. On the other hand, the anisotropic grating 57 of the second polarization diffracting element senses the ordinary refractive index with respect to the linearly-polarized light of the first polarizing direction, therefore, a refractive index difference is not indicated by the isotropic grating 58 relative to the ordinary refractive index, so that the incident light is straightly transmitted by the second polarized light diffraction grating.

In contrast, in the case where the light beam incident to the polarized light changing element 510 is made its polarizing direction to be set to the second polarizing direction by the polarized light changing element 510 and is incident to the polarization diffracting element 520, the first anisotropic grating 56 of the first polarization diffracting element senses the ordinary refractive index with respect to the linearly-polarized light of the second polarizing direction. Therefore, there is no occurrence of a refractive index difference between the ordinary light refractive indices of the anisotropic gratings 56, 57 and the isotropic grating 58 being equal to that, so that the incident light is straightly transmitted by the first polarized light diffraction grating. On the other hand, the second anisotropic grating 57 of the second polarization diffracting element senses the extraordinary refractive index with respect to the linearly-polarized light of the second polarizing direction. Therefore, a refractive index difference is indicated by the isotropic grating 58 relative to the extraordinary refractive index, so that the incident light is diffracted by the second polarized light diffraction grating.

In response to the externally supplied electric signal as described above, the variable diffraction device related to the embodiment changes the refractive indices sensed by the first polarized light diffraction grating and second polarized light diffraction grating with respect to the incident light of the linearly-polarized light. The incident light is then diffracted by either the first polarized light diffraction grating or the second polarized light diffraction grating to be able to switch it to whether it is straightly transmitted without diffraction by other event.

The variable diffraction device relative to the embodiment is formed so that the polarized light changing element 510 may be stacked and integrated with the polarization diffracting element 520 as shown in FIG. 2, but they may also be separated as shown in FIG. 3. Further, the polarization diffracting element 520 can also be constituted by the other constitution so that two polarized light diffraction gratings each having a different diffraction characteristic in response to the polarizing direction are separately formed and put together with each other, rather than the constitution which is commonly integrated with the isotropic grating, as shown in FIGS. 2 and 3. The order of arranging the first and second polarized light diffraction gratings in the polarization diffracting element may be reverse order.

A constitution may also be realized, as follows. The materials made up of the anisotropic gratings 56, 57 and isotropic grating 58 as the constitution (hereinafter, an implemented constitutional example) described above is replaced. An isotropic transparent material layer made up of an isotropic transparent material is formed on both the first and second transparent substrates 51a, 51b, which is then finished by the microfabrication. First and second isotropic gratings having a desirable stripe direction and a grating pitch are formed. The space between stripes adjacent to the isotropic gratings is filled with a liquid crystal material to fabricate an anisotropic grating and form first and second polarized light diffraction gratings, so that the polarized light diffracting element is constituted (hereinafter, referred to as a replaced constitutional example).

In the replaced constitutional example, the liquid crystal molecules are easily oriented in the stripe direction of the isotropic grating. In the case where the stripe direction is largely different between the opposed diffraction gratings, the liquid crystal could be twisted, and a polarizing direction of the light could also be rotated. The polarizing direction of light incident from the variable diffraction device 2b1 is different from the incident light to the variable diffraction device 2b2 when the polarizing direction is rotated as described above. Therefore, when the variable diffraction devices are used in an optical head apparatus, the utilization efficiency of light from the light source could be deteriorated. On the contrary, in the case of implemented constitutional example, the orientation direction of high molecular liquid crystal can be set independently apart the stripe direction of polarized light diffraction grating. Therefore, the problem of rotating the polarizing direction could not be occurred, which is desirable.

Second Embodiment of a Variable Diffraction Device

Figure 5:
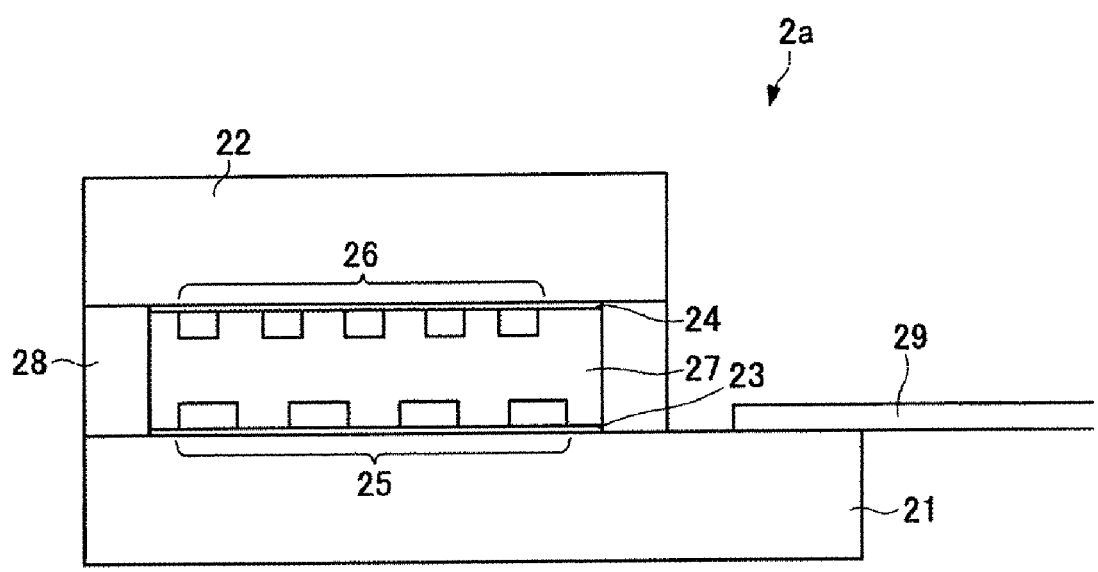
FIG. 5 is a cross-sectional diagram schematically showing one example of a variable diffraction device constituted in the optical head apparatus in the first embodiment of the invention.

FIG. 5 is a schematically cross-sectional diagram showing a structural example of a variable diffraction device 2a constituting an optical head apparatus relative to a second embodiment of the invention. The variable diffraction device 2a includes: a pair of transparent substrates 21, 22 which are oppositely arranged each other; transparent electrodes 23, 24 formed on the opposed surfaces of the transparent substrates 21, 22; a first stripes 25 and second stripes 26 (hereinafter, referred to as a first isotropic grating 25 and second isotropic grating 26, respectively) made up of the isotropic transparent material and formed on the respective first transparent electrode 23 and second transparent electrode 24 in order to form cyclic concavities and convexities; and a liquid crystal 27 held between the transparent substrates 21, 22. A seal material 28, similar to the variable diffraction device in the first embodiment, is formed on peripheries of the transparent substrates 21, 22 which are oppositely arranged, which forms a liquid crystal cell. The liquid crystal cell is filled with a liquid crystal in which a space between the stripes adjacent to the first and second isotropic gratings 25, 26 is filled therewith to constitute an anisotropic grating as stripes made up of the optically anisotropic material. This constitutes first and second polarized light diffraction gratings, and a gap between the transparent substrates 21, 22 is filled therewith so as to cover the isotropic gratings 25, 26, so that the liquid crystal layer 27 is formed.

Grating pitches of the first and second polarized light diffraction gratings is the same as shown in FIG. 4, as well as planar patterns of an opposed oblique angle, which is the same as the variable diffraction device in the first embodiment. The transparent substrates 21, 22, transparent electrodes 23, 24, and the seal material 28, used in the variable diffraction device 2a of this embodiment are the same components as used in the variable diffraction device of the first embodiment.

The transparent electrodes 23, 24 are the same as plane electrodes used in the variable diffraction device of the first embodiment, which is omitted in the constitution shown in FIG. 5. However, it is desirable that an insulation film is deposited on the surfaces of the transparent electrodes 23, 24. Further, it is desirable that an alignment film is formed on a barrier face adjacent to the liquid crystal layer 27. It is desirable that the alignment film is carried out by the orientation processing so that the liquid crystal molecules are aligned substantially with the stripe direction of the first and second isotropic gratings 25, 26 in parallel, when the liquid crystal in liquid crystal layer 27 is aligned with the horizontal orientation. An electric signal is supplied to the transparent electrodes 23, 24 through wirings of a flexible circuit board 29 from an external power source, so that a voltage is applied to the liquid crystal layer 27.

The liquid crystal used in the liquid crystal layer 27 can be used of nematic liquid crystal, smectic liquid crystal, etc. The liquid crystal can also be used of either dielectric constant anisotropy $\Delta\in$ is positive or negative. The liquid crystal layer 27 can be switched to either the horizontal oriented state indicating that the liquid crystal molecules are oriented in parallel with the surface of board or the vertical oriented state indicating that they are oriented in vertical direction, in response to presence or absence of the applied voltage. For this reason, the refractive index substantially indicated by the liquid crystal layer 27 can be changed from the extraordinary refractive index to the ordinary refractive index, in response to a linearly-polarized light having a polarizing direction parallel with the stripe direction of the first and second isotropic gratings 25, 26. Hereinafter, a lower one of either the ordinary refractive index $n_o$ or the extraordinary refractive index $n_e$ is referred to as a first refractive index $n_b$, and a higher one thereof is referred to as a second refractive index $n_a$. The liquid crystal constituting the liquid crystal layer 27 is suitable for reducing a stray light caused by a scattered light since the liquid crystal molecules are aligned to the vertical orientation in the non-applied voltage and the orientation direction of liquid crystal is not subject to dislocation due to the concavities and convexities of the first and second isotropic gratings 25, 26, when the dielectric constant anisotropy is negative. Further, the liquid crystal layer 27 can be used of other materials without limiting the materials of liquid crystal, but it should be used of materials which substantially causes the change of refractive index in response to the applied voltage.

The first and second isotropic gratings 25, 26 are formed of materials each having different refractive indices $n_1$, $n_2$. These gratings and an anisotropic grating filling in a gap between the adjacent gratings constitute a first anisotropic grating and a second anisotropic grating. Here, in the case of the refractive indices $n_1$, $n_2$ each having a different refractive index for each of the first and second isotropic gratings 25, 26, one is equal or close to the first refractive index $n_b$, and the other is equal or close to the second refractive index $n_a$. The first and second isotropic gratings 25, 26 are formed by the following steps. A film is selected from either inorganic materials such as $SiO_2$, $SiO_xN_y$, $Ta_2O_5$, etc. or a mixture with these inorganic materials, or other organic materials having a desirable refractive index. The foregoing film is deposited on the transparent electrodes 23, 24. A patterning process is applied to the film by using the photolithography and etching processing techniques. The depositing method for the thin film and patterning method for the electrodes can be replace by the various well known methods.

The plate portion having the concavities between the stripes of the first and second isotropic gratings 25, 26 is not limited to the refractive index. Specifically, the gap between the first and second isotropic gratings 25, 26 may be of an isotropic material having the refractive index $n_1$ or $n_2$. Isotropic materials having a refractive index other than $n_1$, $n_2$ may also be used, such as transparent substrates, transparent electrodes, etc.

When an incident light as a linearly-polarized light of the polarizing direction parallel with the stripe direction of the first and second polarized light diffraction gratings is incident to the variable diffraction device 2a used in the optical head apparatus relative to this embodiment, the refractive index of liquid crystal layer 27 with respect to the incident light changes the orientation state of liquid crystal layer 27 by an applied voltage to the transparent electrodes 23, 24 from an non-illustrated external electrode, so that the refractive index can be changed in a range from the first refractive index $n_b$ to the second refractive index $n_a$. In this way, the refractive index sensed by the liquid crystal layer 27 can be changed from a state where the refractive index of the liquid crystal layer 27 is substantially equal to the refractive index $n_1$ of the isotropic grating 25 to a state where that is substantially equal to the refractive index $n_2$ of the second isotropic grating 26. Hereinafter, the refractive index of liquid crystal layer 27 is adjusted by the applied voltage, and that refractive index is made substantially consistent with the refractive indices of the isotropic gratings 25, 26, which means that the refractive indices are matched with each other.

Incidentally, the foregoing description has been explained the constitutions so that the isotropic gratings 25, 26 are formed on the transparent electrodes 23, 24, respectively, but the application of the invention is not necessary to be limited to such constitutions. The following constitution may also be applicable. That is, the isotropic gratings 25, 26 are formed on the transparent substrates 21, 22, respectively, and subsequently, the transparent electrodes 23, 24 are formed on the transparent substrates 21, 22 and the isotropic gratings 25, 26.

It is desirable that the thickness of liquid crystal 27 is made not more than one-hundredth compared with the thickness of transparent substrates 21, 22. The liquid crystal material has an extremely large thermal expansion coefficient compared with the transparent substrates 21, 22 and seal material 28. For this reason, the liquid crystal 27 expands and constricts to easily deform the device caused by temperature variation. This causes the liquid crystal to become a convexity lens shape or concavity lens shape. Therefore, if the thickness of liquid crystal layer 27 is made not more than the foregoing ratio with respect to the thickness of transparent substrates 21, 22, the aforementioned device deformation can be restrained in sufficiently small range. Further, it is more desirable from point of view of enhancing the rigidity of boards that the thickness of liquid crystal layer 27 is made not more than one-hundred fiftieth compared with the thickness of transparent substrates 21, 22. Here, the thickness of each of the liquid crystal layer 27 and the transparent substrates means an average thickness in consideration of the thickness of grating.

The order of arranging the first and second polarized light diffraction gratings in the polarization diffracting element may be reverse order.

Next, an optical characteristic of the variable diffraction device 2a in this embodiment will be explained. Hereinafter, the liquid crystal used in liquid crystal layer 27 is set to a case where the dielectric constant anisotropy $\Delta \epsilon$ is positive and the extraordinary refractive index is larger than the ordinary refractive index. The different refractive indices $n_1$, $n_2$ for the respective first and second isotropic gratings 25, 26 are defined as $n_1 < n_2$.

In a state where a voltage is not applied to the liquid crystal layer 27, the liquid crystal layer 27 of the variable diffraction device 2a is aligned to the horizontal orientation to indicate the second refractive index $n_a$ with respect to the incident light. As the applied voltage is increased, the orientation state is come close to the horizontal orientation and becomes indicating a refractive index close to the first refractive index $n_b$. Accordingly, the refractive index of liquid crystal can be changed in a range from the first refractive index $n_b$ to the second refractive index $n_a$ by the applied voltage to the liquid crystal layer 27.

By controlling the applied voltage to the liquid crystal layer 27, the refractive index of liquid crystal layer 27 with respect to the incident light of linearly-polarized light, in which the polarizing direction is parallel with the stripe direction, is matched with one of either the refractive indices $n_1$, $n_2$ of the first and second isotropic gratings 25, 26, so that the liquid crystal layer 27 has a refractive index difference from the other isotropic grating which is not matched with the refractive index. Therefore, the incident light incident to the variable diffraction device 2a is straightly transmitted without diffracting by the polarized light diffraction grating constituting the isotropic grating and the liquid crystal layer 27 which are matched with the refractive index. The incident light is diffracted with the diffraction efficiency determined by a product of a grating height multiplied by the refractive index difference, by the polarized light diffraction grating constituting the other isotropic grating and the liquid crystal layer 27 which are not matched with the refractive index.

The refractive index $n_1$ of the first isotropic grating 25 and the refractive index $n_2$ of the second isotropic grating 26 may be made substantially equal to the first refractive index $n_b$ and second refractive index $n_a$ of the liquid crystal, respectively, but may also be set to a range where they can be made larger than the first refractive index $n_b$ and smaller than the second refractive index $n_a$ of the liquid crystal.

A relationship between the applied voltage to the liquid crystal layer 27 and the refractive index of liquid crystal layer 27 with respect to the linearly-polarized light of polarizing direction parallel with the stripe direction of grating in the variable diffraction device 2a will be explained with a schematic graph in FIG. 6. Here, the liquid crystal used in the liquid crystal layer 27 is the same as that described in the foregoing description, and the refractive indices $n_1$, $n_2$ of the first and second isotropic gratings 25, 26, respectively, are defined so that they are larger than the first refractive index $n_b$ and smaller than the second refractive index $n_a$ of the liquid crystal.

Figure 6:
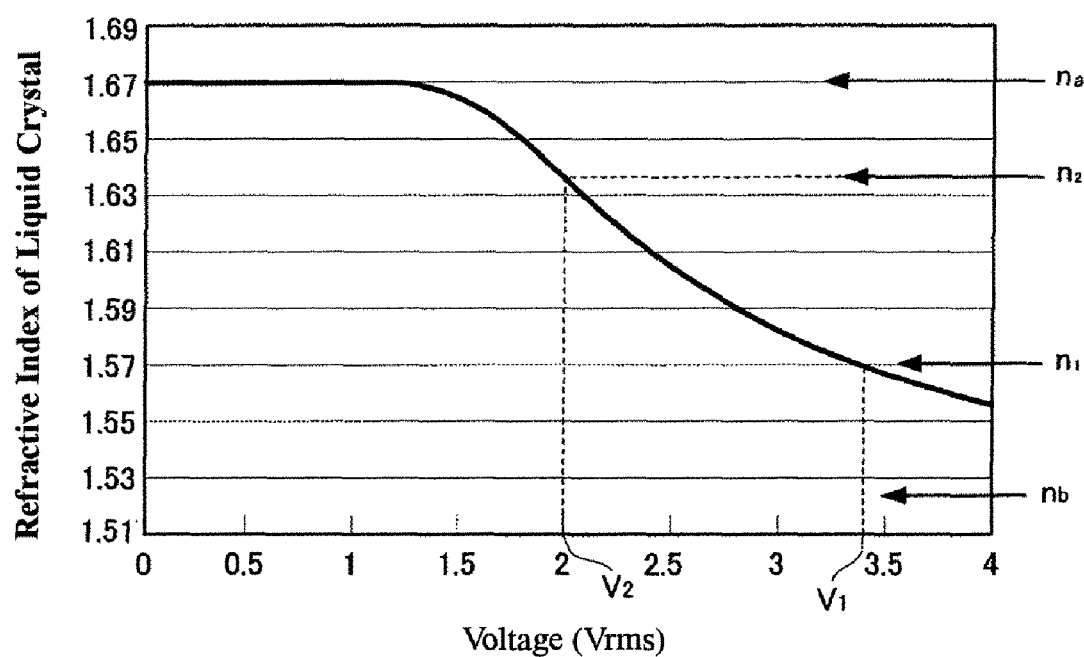
FIG. 6 is a graph showing an example of relation between a voltage (applied to a liquid crystal layer 27) applied to the transparent electrodes 23, 24 constituted in a variable diffraction device 2a and a refractive index of a liquid crystal layer 27.
Figure 7:
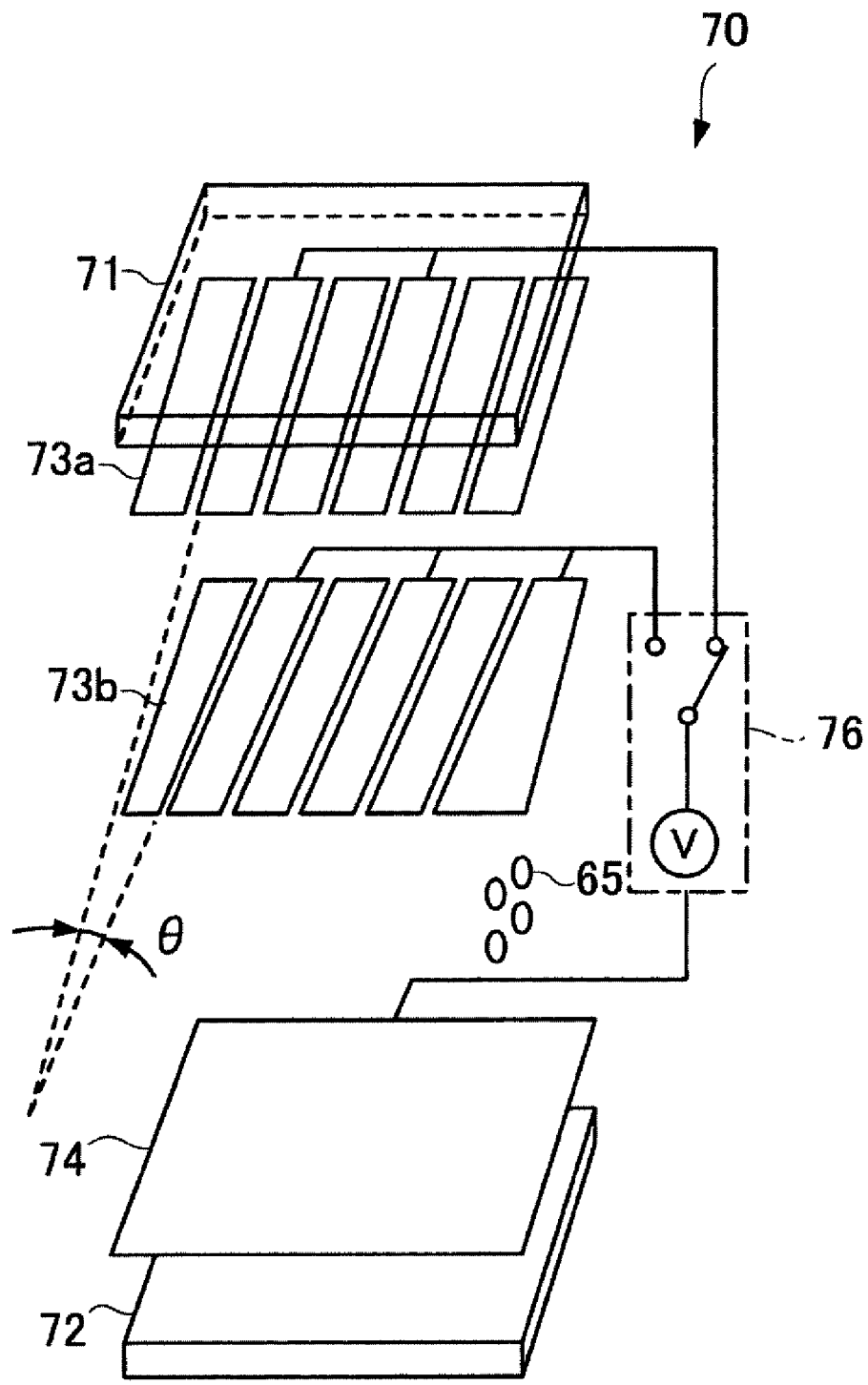
FIG. 7 is a diagram schematically showing a constitution of a conventional liquid crystal diffraction device.

The refractive index of liquid crystal layer 27 can be changed by adjusting the applied voltage, as an applied voltage $V_1$, to the liquid crystal layer 27 in which the applied voltage is indicated by an actual value on the abscissa axis in FIG. 6. The diffraction does not occur with the first anisotropic diffraction grating constituted by the first isotropic grating 25 and the liquid crystal layer 27 when the refractive index of liquid crystal layer 27 is matched with the refractive index n, of the first isotropic grating 25, and the diffraction occurs with the second anisotropic diffraction grating constituted by the second isotropic grating 26 and the liquid crystal layer 27. Further, the diffraction does not occur with the second anisotropic diffraction grating constituted by the second isotropic grating 26 and the liquid crystal layer 27 when the refractive index of liquid crystal layer 27 is matched with the refractive index $n_2$ of the second isotropic grating 26 at the applied voltage $V_2$, and the diffraction occurs with the first anisotropic diffraction grating constituted by the first isotropic grating 25 and the liquid crystal layer 27.

It is desirable that the refractive index $n_1$ of the first isotropic grating 25 is made larger than the first refractive index $n_b$ of the liquid crystal layer 27 and not more than $n_b + 0.4 \times \Delta n$, and the refractive index $n_2$ of the second isotropic grating 26 is made from $n_a - 0.4 \times \Delta n$ to $n_a - 0.1 \Delta n$. Here, $\Delta n$ is a difference between the second refractive index $n_2$ and the first refractive index $n_b$ of the liquid crystal layer 27. If $n_1$, $n_2$ are set to such range and when an ambient temperature for using the variable diffraction device is changed to occur a temperature change for the refractive index of liquid crystal layer 27, the refractive index can also be matched, by adjusting the applied voltage $V_2$, with the second refractive index $n_a$ having a larger temperature change for refractive index than that for the liquid crystal layer.

Hereinafter, a manufacturing method of the variable diffraction device 2a will be explained in relation to the embodiment, however, this manufacturing method is not limited to the following manner. First, the transparent substrates 21, 22 are provided. The transparent electrodes 23, 24 are formed on ones of the surfaces of transparent substrates 21, 22. An isotropic transparent material film made up of the isotropic transparent material is further formed on the respective transparent electrodes 23, 24. The isotropic transparent material film, as the first isotropic grating 25, formed on the first transparent substrate 21 and also the isotropic transparent material film, as the second isotropic grating 26, formed on the second isotropic grating 26, are set to the foregoing indices $n_1$, $n_2$, respectively, by adjusting their materials and the film forming condition. Both the films are also formed with the predetermined film thicknesses $d_1$, $d_2$, respectively.

Next, the isotropic transparent material films formed on the respective transparent substrates are fabricated of the isotropic gratings 25, 26 as shown in FIG. 4. The isotropic gratings 25, 26 are therefore formed so that an opposed oblique angle in the stripe direction is set to a predetermined angle one another, and they are set to a predetermined pitch as diffraction grating, if the first and second transparent substrates 21, 22 are oppositely arranged one another. It is desirable that the etching process for the isotropic transparent material films is carried out up to the barrier face at the transparent electrodes 23, 24, however, a part of the isotropic transparent material film may also be left. The height of formed steps becomes the height $d_1$, $d_2$ of the diffraction gratings. The height $d_1$, $d_2$ may also be made different or equal. The diffraction efficiency of the first and second polarized light diffraction gratings can be adjusted appropriately by setting $d_1$ and $d_2$.

The sputtering method is suitably used for a forming method of the transparent electrodes and isotropic transparent material films, and the photolithography and etching process are also suitably used for a patterning method. A further explanation will be omitted, however, the well known method may be used without limiting to the foregoing methods.

The surfaces of transparent substrates 21, 22 on which the transparent electrodes 23, 24 and the isotropic gratings 25, 26 are formed, respectively, are oppositely arranged each other, and the peripheries of transparent substrates 21, 22 are sealed by the seal material 28 to thereby form a liquid crystal cell.

The liquid crystal is then injected into the liquid crystal cell. Spaces between the stripes adjacent to the first and second isotropic gratings 25, 26 are filled with the liquid crystal to constitute the anisotropic gratings as the stripes made up of the optically anisotropic material. This forms first and second polarized light diffraction gratings. The isotropic gratings 25, 26 are covered by the transparent substrates 21, 22 between which is filled with the liquid crystal and sealed, so that the liquid crystal layer 27 is formed to thereby obtain the variable diffraction device 2a. As occasion demands, the flexible circuit board 29 is connected to the transparent electrodes 23, 24 for applying a voltage to the liquid crystal layer 27 by supplying an electric signal from an external power source. Incidentally, it is desirable that a non-illustrated insulation film is deposited on the surfaces of transparent electrodes 23, 24, an non-illustrated alignment film is formed on the surfaces of transparent electrodes 23, 24 and isotropic gratings 25, 26 in contact with the liquid crystal layer 27, and the orientation processing is then carried out in parallel with the stripe directions of the respective transparent substrates.

In either case of the variable diffraction device described in both the first and second embodiments, the transparent electrodes can be formed on the planar surfaces of the transparent substrates, so that the transparent electrodes may be prevented from disconnection caused by the steps.

First Embodiment of an Optical Head Apparatus

An optical head apparatus in this embodiment will be explained by using FIG. 1 showing a conceptual constitution. The optical head apparatus 100 includes: a light source 1; a variable diffraction device 2 for forming three beamed light source lights consisting of a main beam and two sub-beams by diffracting a part of the light source lights emitted from the light source 1; a beam splitter 3 for transmitting the foregoing three beams emitted from the variable diffraction device 2, reflecting return lights returned by reflecting lights from an information recording surface 7a of an optical disk 7, and introducing the return lights to a light detector 8; a collimator lens 4 for converting diverged luminous flux incident from the beam splitter 3 into substantially parallel lights; an aperture 5; an objective lens 6; and the light detector 8 for detecting return lights of the three beams.

The light source light emitted from the light source 1 is converted into the three beams by the variable diffraction device 2. These beams are transmitted to the beam splitter 3, collimator lens 4, and aperture 5 in this order, and then irradiated and focused on the information recording surface 7a of the optical disk 7 by the objective lens 6. The aperture 5 is constituted so that a luminous flux from the collimator lens 4 is selectively limited in accordance with its opening when a reading and writing are carried out from/to the optical disks each having different a numerical aperture NA. There are apertures such as a mechanical aperture, optical aperture, etc., a type of aperture is not limited to this embodiment.

The three beams irradiated and focused on the information recording surface 7a of optical disk 7 become return light consisting of the three beams reflected by the information recording surface 7a, and transmit to the objective lens 6, aperture 5 and collimator lens 4. The three beams are reflected by the beam splitter 3 and incident to the light detector 8, so that an information signal recorded on the information recording surface 7a is read out.

In the light detector 8, a focusing error signal and tracking error signal are generated, except a read signal of the information recorded on the information recording surface 7a. Therefore, a focusing servo (not shown in the drawings), which controls the lenses in an optical axis direction on the basis of the focusing error signal, is drove and a tracking servo (not shown in the drawings), which controls the lenses in a direction substantially perpendicular to the optical axis on the basis of the tracking error signal, is drove.

The light source 1 is of a semiconductor laser light source which emits a diverged luminous flux of the linearly-polarized light present in the proximity of a 660 nm wavelength. Incidentally, the light source 1 is not limited to use the light source which emits the luminous flux present in the proximity of the 660 nm wavelength, other light sources may also be used for emitting luminous fluxes of other wavelengths such as proximity of a 400 nm and that of a 780 nm wavelength. Further, the light source 1 may also be of a multiple wavelength laser light source having light sources integrally packaged therein so that the luminous fluxes of two or three wavelengths can be emitted. Here, the wavelengths of proximities of the 400 nm, 650 nm and 780 nm mean that the wavelengths are present in ranges of 385 nm to 430 nm, 630 nm to 670 nm and 760 nm to 800 nm, respectively.

The optical head apparatus in this embodiment includes the variable diffraction device already described in the first embodiment, as the variable diffraction device 2. That is, the variable diffraction device 2 for use in the optical head apparatus in this embodiment includes the polarized light changing element 510 and polarization diffracting element 520, which has the constitution of FIG. 2 showing a cross-sectional diagram. The variable diffraction device of the following explanation is the same as that explained in the first embodiment, except that specific explanation will be annexed.

The polarized light changing element 510 has 5 μm in thickness and a liquid crystal layer 53 made up of the twisted nematic liquid crystal in which the directions of liquid crystal molecules at incident and emitting sides are twisted at 90 degrees and set to a twisted orientation. The polarized light changing element is constituted so that a light is emitted by an applied voltage to the liquid crystal layer 53 and by switching the polarizing direction of incident light of the linearly-polarized light.

The polarization diffracting element 520 including a high molecule liquid crystal, the ordinary refractive index $n_o$ of which is 1.52 and the extraordinary refractive index $n_e$ of which is 1.57, and the isotropic grating 58 made up of a seal material having a 1.52, and also includes the first anisotropic grating 56, the grating height $d_1$ of which is 1.6 μm and the grating pitch of which is 12 μm, and the second anisotropic grating 57, the grating height $d_2$ of which is 1.9 μm and the grating pitch of which is 13 μm.

An optical path length defined as a product of a refractive index difference between a grating concavity and concave portions of the first and second polarized light diffraction gratings multiplied by the grating heights meets $(n_e-n_s) \cdot d_1 = 0.8$ μm and $(n_e-n_s) \cdot d_2 = 0.95$ μm, respectively. The diffraction efficiency of the diffraction gratings is determined in response to the optical path length defined as the product of the grating height multiplied by the refractive index difference between the grating concavity and concave portions of the grating. That is, in the case of first polarization diffraction grating, zero-order diffraction efficiency is 86% and primary-order diffraction efficiency is 5.7% with respect to the first polarizing direction, and zero-order diffraction efficiency is about 100% and primary diffraction efficiency is about 0% with respect to the second polarizing direction. In the case of second polarization diffracting grating, zero-order diffraction efficiency is 81% and primary-order diffraction efficiency is 7.7% with respect to the second polarizing direction, and zero-order diffraction efficiency is about 100% and primary-order diffraction efficiency is about 0% with respect to the first polarizing direction.

That is, in the case of first polarization diffraction grating, a ratio (hereinafter, referred to as zero-order/primary-order ratio) obtained from dividing the zero-order diffraction efficiency by the primary diffraction efficiency is 15.1 with respect to the first polarizing direction. A ratio (hereinafter, referred to as a diffraction efficiency ratio) obtained from dividing the diffraction efficiency of the luminous flux with respect to the second polarizing direction by the diffraction efficiency of the luminous flux with respect to the first polarizing direction is about "0". In the case of second polarization diffraction grating, the zero-order/primary-order ratio obtained from dividing the zero-order diffraction efficiency by the primary diffraction efficiency is 10.5 with respect to the second polarizing direction. The diffraction efficiency ratio obtained from dividing the diffraction efficiency of the luminous flux in the first polarizing direction by the diffraction efficiency of the luminous flux in the second polarizing direction is about "0".

The optical head apparatus in the embodiment operates with the following manner. A applied voltage supplied from a non-illustrated external power source to the transparent electrodes 52a, 52b of the polarized light changing element 510 is controlled to switch the polarizing direction of an incident light to the polarizatsion diffracting element 520 from the polarized light changing element 510, so that the incident light to the variable diffraction device 2 can be switched by whether it is diffracted by the first polarized light diffraction grating or second polarized light diffraction grating. Therefore, an appropriate one of the three beams is switched and generated in response to a track pitch formed on one of the optical disks each having a different track pitch, so that compatible reading and writing can be carried out.

Further, in the case of the variable diffraction device 2 for use in the optical head apparatus in the embodiment, if the diffraction efficiency ratio between a polarization in the polarizing direction used for the reading or writing and a polarization in the polarizing direction not used for the reading or writing is set to a range of from 0 to 0.5, it is desirable to reduce a noise influence on the tracking servo, in the case of using the variable diffraction device for generating the three beams and detecting a tracking error. It is also desirable to set the diffraction efficiency ratio to from 0 to 0.3 in order to further reduce the noise influence on the tracking servo. It is further desirable that the diffraction efficiency ratio is set to from 0 to 0.1 in order to further attempt to enhance accuracy.

In the case of the zero-order/primary-order ratio obtained from dividing the zero-order diffraction efficiency by the primary-order diffraction efficiency, a small zero-order/primary-order ratio makes the signal intensity of a sub-beam to become high, so that the SN ratio of tracking signal can be improved. Therefore, it is further desirable that the zero-order/primary-order ratio is 20 or less, and 15 or less is more desirable, in the case of reading. On the contrary, in the case of writing, a large zero-order/primary-order ratio makes the signal intensity of main beam to become high. This is desirable since the optical power can be set to high in writing. For this reason, in the case of writing, it is more desirable that the zero-order/primary-order ratio is 8 or more, and 12 or more is much more desirable. Therefore, in the case of a read-only optical head apparatus, it is more desirable that the zero-order/primary-order ratio is 5 to 20, but a range of 5 to 15 is much more desirable. In the case of a readable and writable optical head apparatus, it is more desirable that the zero-order/primary-order ratio is 8 to 20, but a range of 12 to 15 is much more desirable. The foregoing diffraction efficiency can be adjusted by changing the optical path length defined as the product of the grating heights of the respective polarizing diffraction gratins multiplied by the refractive index difference between the concavity and concave portions of the gratings.

In the case where the variable diffraction device is used for generating the corresponding three beams to a track pitch of the reading and writing optical disk, the pitch of diffraction gratings is desirably ranged from 10 μm to 20 μm. If the diffraction gratings are set to the foregoing pitch, intervals of the three irradiated spots formed by focusing the three beams on the optical disk 7 can be made in a range of 5 μm to 20 μm, so that a stable tracking characteristic can be realized.

Second Embodiment of an Optical Head Apparatus

An optical head apparatus in this embodiment basically has the constitution of optical head apparatus in the first embodiment, except that a variable diffraction device in the second embodiment is used as a variable diffraction device 2.

The optical head apparatus in this embodiment includes the variable diffraction device in the second embodiment shown in a cross-sectional diagram of FIG. 5 as a variable diffraction device 2. Incidentally, the variable diffraction device with the following explanation is the same as that explained in the second embodiment, except that specific explanation will be annexed.

The variable diffraction device 2 for use in the optical head apparatus in this embodiment is formed by the following manner. First, the transparent substrates 21, 22 are provided. A transparent conductive film made up of ITO film is formed on a surface of one of the transparent substrate by the sputtering method. A patterning is then applied thereto by the lithography and etching processes to form the transparent electrodes 23, 24 in an optically effective entire area of the variable diffraction device 2.

Subsequently, $SiO_xN_y$ films each having refractive index of 1.57 and 1.64 are deposited on the transparent electrodes 23, 24, respectively, by the sputtering method. A patterning is then applied to the films as a planar pattern shown in FIG. 4 by the lithography and etching processes to form the first isotropic grating 25 and second isotropic grating 26. An insulation film, which is not shown in FIG. 5, is deposited on the surfaces of transparent electrodes 23, 24. An alignment film is further formed on boundary faces adjacent to the liquid crystal layer 27 between the transparent electrodes 23, 24 and between the first and second isotropic gratings 25, 26. An orientation processing is then applied to the stripe directions of the gratings. The first isotropic grating 25 and second isotropic grating 26 have grating heights $d_1$ and $d_2$, respectively, in which $d_1$ is 1.14 μm and $d_2$ is also 1.14 μm, and have diffraction grating pitches, respectively, each of which is different in that one is 12 μm and the other is 18 μm. An opposed oblique angle is set to 1 degree when a liquid crystal cell is completed.

Next, the transparent substrates 21, 22 are opposed to the sides where the transparent electrodes 23, 24 and the first and second isotropic gratings 25, 26 are formed, and the seal material 28 is formed on the peripheries of transparent substrates to thereby constitute a liquid crystal cell. Further, the liquid crystal cell is filled with a liquid crystal to form the liquid crystal layer 27, so that the variable diffraction device 2 can be obtained. The liquid crystal is used as the nematic liquid crystal having a positive dielectric constant anisotropy and also having the ordinary refractive index $n_b$ which is 1.52 and extraordinary refractive index $n_a$ which is 1.67. The thickness of liquid crystal layer 27 is set to 3.5 μm.

Since the average thickness for each of transparent substrates 21, 22 is not less than 100 times the average thickness of liquid crystal layer 27, the variable diffraction device 2 is restrained in a practically usable range so that the variable diffraction device can be realized with a convex lens or concave lens, even though the ambient temperature of the device is changed.

In the case of the optical head apparatus in the embodiment, the light source 1 and variable diffraction device 2 are arranged so that the polarizing direction of light source light of a linearly-polarized light incident to the variable diffraction device 2 becomes parallel with the stripe direction of the first polarized light diffraction grating formed on the incident surface side of the variable diffraction device 2. A relation between a RMS value of a rectangular wave voltage to be applied to the liquid crystal layer 27 and the refractive index of liquid crystal layer 27 with respect to the linearly-polarized light in the polarizing direction parallel with the stripe direction of the grating is schematically shown in FIG. 6 as a graph.

First, the following cases will be explained, one is that the light source light incident to the variable diffraction device 2 is diffracted by the first polarized light diffraction grating constituting the first isotropic grating 25 and liquid crystal layer 27, and the other is that the light source light incident to the same is not diffracted by the second polarized light diffraction grating constituting the second isotropic grating 26 and liquid crystal layer 27. When a voltage of 2.0 $V_{rms}$ as a RMS value is applied to the liquid crystal layer 27, the refractive index of liquid crystal layer is controlled to 1.64 to be consistent the refractive index of liquid crystal layer 27 with that of the second isotropic grating 26, so that the diffraction is not occurred with the second polarized light diffraction grating. At this time, in the case of the first polarized light diffraction grating, a refractive index difference between the first isotropic grating 25 having a 1.57 refractive index and the liquid crystal layer 27 is 0.07, and the grating height $d_1$ is 1.14 μm. As a result, the zero-order diffraction efficiency (or transmission factor) and the primary-order diffraction efficiency caused by the first polarized light diffraction grating are 86% and 5.7%, respectively. The zero-order diffraction efficiency (or transmission factor) and the primary-order caused by the second polarized light diffraction grating are substantially 100% and 0%, respectively.

Next, when a voltage of 3.4 $V_{rms}$ as a RMS value is applied to the liquid crystal layer 27, the refractive index of liquid crystal layer is controlled to 1.57 to be consistent the refractive index of liquid crystal layer 27 with that of the first isotropic grating 26, so that the diffraction is not occurred with the first polarized light diffraction grating. At this time, in the case of the second polarized light diffraction grating, a refractive index difference between the second isotropic grating 26 having a 1.64 refractive index and the liquid crystal layer 27 is 0.07, and the grating height $d_1$ is 1.14 μm. As a result, the light source light is not diffracted by the first polarized light diffraction grating, but diffracted by the second polarized light diffraction grating. Therefore, the zero-order diffraction efficiency (or transmission factor) and the primary-order efficiency caused by the first polarized light diffraction grating are substantially 100% and 0%, respectively, and the zero-order diffraction efficiency (or transmission factor) and the primary-order diffraction efficiency caused by the second polarized light diffraction grating are 86% and 5.7%, respectively.

In the case of the variable diffraction device 2 for use in the optical head apparatus in this embodiment, it is desirable that the variable diffraction device has both the diffraction efficiency ratio and the zero-order/primary-order ratio of the first and second polarized light diffraction gratings similar to the variable diffraction device for use in the optical head apparatus in the first embodiment. In the case of the foregoing constitutional variable diffraction device 2, as to the first polarized light diffraction grating, the zero-order/primary-order ratio in the first polarizing direction is 15.1, and the diffraction efficiency ratio obtained from a result of the diffraction efficiency of the luminous flux in the second polarizing direction divided by the diffraction efficiency of the luminous flux in the first polarizing direction is substantially 0. As to the second polarized light diffraction grating, the zero-order/primary-order ratio in the second polarizing direction is 15.1, and the diffraction efficiency ratio obtained from dividing the diffraction efficiency of the luminous flux in the first polarizing direction by the diffraction efficiency of the luminous flux in the second polarizing direction is substantially 0. Therefore, a noise influence on the tracking servo is restrained small and desirable signal intensity for the sub-beams can be obtained, so that good reading and writing characteristics can be obtained.

In addition, if the first polarized light diffraction grating and second polarized light diffraction grating each having a different diffraction grating pitch are switched and used each other, three applicable beams can be generated in response to the optical disks each having a different tack pitch. Thus, a noise influence on the tracking servo can be reduced.

Further, since the refractive index of liquid crystal layer 27 can be changed by adjusting an applied voltage to the liquid crystal layer 27, the refractive indices can be matched with each other by the applied voltages $V_1$, $V_2$ to obtain the foregoing diffraction efficiencies, even though the ambient temperature is changed in using the variable diffraction device.

Incidentally, the constitution has been explained in the foregoing description so that the luminous flux emitted from the light source is divided into one main beam and two sub-beams by the variable diffraction device. The invention is not applicably limited to the constitution, and can be applicable to all of devices to be switched the diffraction gratings.

For example, the variable diffraction device of the invention can be used suitably as attenuator for switching the irradiating intensity of light source light to be irradiated on the optical recording medium in the optical head apparatus for reading and writing from/to the optical recording medium. In this case, the variable diffraction device of the invention is arranged in an outward optical path and the light source intensity remains constant. The first and second polarized light diffraction gratings are switched so that one is used for a condition for irradiation without attenuating the light source light and the other is used for a condition for irradiation with a desired intensity attenuated, so that the irradiating intensity can be stable, and good reading and writing characteristics can be realized. In the case of using as an attenuator, it is desirable that the diffraction grating pitch is 10 μm or less, but more desirable if it is 5 μm or less. If the diffraction grating pitch exceeds 10 μm, the diffracted light could be irradiated on the optical disk and reflected thereby, and then become a stray light to be incident to the light detector. If the diffraction grating pitch is set to 3 μm or less, the diffracted light is not transmitted through the objective lens and a stray light can be restrained effectively, which is particularly desirable. On the contrary, since it is difficult to produce a diffraction grating having a small pitch, the diffraction grating pitch is desirably 0.5 μm or more, and more desirably 2 μm or more in consideration of the manufacturing yield.

The other polarized light diffraction grating pitch of the variable diffraction devices in the invention is set to infinite and the diffraction patterns do not exist substantially. From this constitution, the variable diffraction device may also be usably arranged in series with the other variable diffraction device for generating a different diffracted light. According to such constitution, the variable diffraction devices, which can generate and switch a plurality, not limited to two types but more, of diffracted lights, can be used to carry out an optimal signal detection when reading and writing with respect to a plurality, not limited to two types but more, of optical disks each having a different specification.

Third Embodiment of an Optical Head Apparatus

An optical head apparatus in the third embodiment is constituted in such a way that the variable diffraction device 2 is arranged in a homeward optical path between the beam splitter 3 and light detector 8 to straightly transmit a return luminous flux from the information recording surface 7a on the optical disk 7, diffract a part of the return luminous flux, and focus the return light to a plurality of acceptance surfaces. This constitution is different from the optical head apparatus 100 in the first and second embodiments the variable diffraction device 2 is arranged in the outward optical path between the light source 1 and the beam splitter 3, and three beams are generated from the light source light emitted from the light source 1. The other constitution is the same as described above.

Other arrangement and constitution of the optical head apparatus is the same as the optical head apparatus 100 in the first embodiment, therefore, the same reference numerals are annexed to the same constitutions and their detailed explanation is omitted.

In the optical head apparatus in the embodiment, the foregoing variable diffraction device partly diffracts the return light from the optical disk, and switches either the zero-order diffracted light (transmitting light) or the ±primary-order diffracted light for reading detection purposed optical signals of the focusing servo and tracking servo from the information signal detected by the light detector 8, in response to the optical disks each having a different format specification such as a track pitch on the information recording surface etc.

The variable diffraction device for use in the optical head apparatus in the embodiment may be used of either the constitution of the device described in the first or second embodiment. The stripe shape diffraction grating patterns of the variable diffraction device are designed so that the diffraction pattern is generated for detecting optimal focusing servo and tracking servo for the optical disks each having an appropriate specification. That is, the incident luminous surface is divided into plural areas. The diffraction grating pitch and stripe direction may be set differently to each of the areas. A lens function and a wave aberration generating function may be annexed to a grating pattern in the area.

Further, either both ±primary-order diffracted lights or one of those may be used in a constitution without using the zero-order diffracted light (transmission light). The grating cross-sectional configuration of variable diffraction device is formed of a blaze configuration having a saw-tooth shape, and the saw-tooth shape is formed of a pseudo-blaze configuration having nearly a staircase shape. In this way, it is desirable to enhance the diffraction efficiency of either +1primary-order diffracted light or −1primary diffracted light.

For example, the cross-sectional configuration of anisotropic grating 56 is formed of the pseudo-blaze configuration having nearly a four-step staircase shape, and the diffraction efficiency ratio of the −1primary-order diffracted light and +1primary diffracted light is set to 1:10. The −1primary diffracted light is then used as the tracking servo signal, and the +1primary diffracted light is used as a reading/writing and a focusing servo signal. Therefore, signal detection with a high SN ratio can be carried out in a high speed for the reading and writing.

In this embodiment, the variable diffraction device 2 is arranged in the optical path between the beam splitter 3 and light detector 8. Therefore, there is no light quantity reduction of the zero-order diffracted light (transmission light) in the outward optical path. For this reason, this is useful for a writing purpose optical head apparatus which is necessary for the efficiency of high zero-order diffracted light.

The polarized light diffraction grating pitch of one of the variable diffraction devices in the invention may be set to infinite, and is made so that the diffraction pattern does not exist substantially. The variable diffraction device may be arranged in series with the other variable diffraction device for generating a different diffracted light. According to such constitution, a variable diffraction device can be realized so that the plural diffracted lights are switched to one another and emitted without limiting to the two types, and optimal signal detection becomes possible if the reading and writing are carried out from and to the optical disks each having a different specification.

Fourth Embodiment of an Optical Head Apparatus

An optical head apparatus in the fourth embodiment is constituted so that the variable diffraction device 2 is arranged in an optical path between the beam splitter 3 and objective lens 6, which is different in that the variable diffraction device 2 is arranged in the homeward optical path between the light source 1 and beam splitter 3 to generate three beams from a light source light emitted from the light source 1 in the optical head apparatus 100 relative to the first and second embodiments. The other constitution is the same as described above. The other arrangement and constitution of the optical head apparatus are the same as the optical head apparatus in the first embodiment, therefore, the same reference numerals are annexed to the same elements, and their explanations are omitted.

In the case of the optical head apparatus in this embodiment, the light source light emitted from the light source 1 is incident to the variable diffraction device 2 in the outward path to the optical disk, and incident to the objective lens 6. The light source light is then focused by the objective lens 6 and irradiated on the information recording surface 7a of optical disk 7. A return light reflected by the information recording surface 7a is again incident to the variable diffraction device 2 through the beam splitter 3 in the homeward path and introduced into the light detector 8 by the beam splitter 3.

When information is read out from the information recording surface 7a of optical disk, it is necessary to make a light quantity small to arrive in the optical disk. A semiconductor laser as the light source 1 has a problem such that its oscillation becomes unstable to increase a noise which causes adverse effect for the reading performance when the emitted light quantity is set to small.

The optical head apparatus in this embodiment can switch to either a condition of irradiating a large irradiated light quantity suitable for the writing by diffraction with low polarized light diffraction gratings having a ±primary-order diffraction efficiency, or a condition of irradiating a small irradiated light quantity suitable for the reading by diffraction with high polarized light diffraction gratings having the ±primary-order diffraction efficiency, in such a way that the emitted light quantity from the light source is kept constant by switching the polarized light diffraction gratings of variable diffraction device 2 which diffracts light by an externally supplied electric signal. In this way, the reading and writing can be carried out by a stable irradiation light having a low noise with respect to the optical disk.

The optical head apparatus in this embodiment can be used desirably for two-layered and one-layered optical disks having the information recording surface, other than for switching the reading and writing. The foregoing diffraction efficiency can be adjusted by changing the optical path length as a product the height of the polarized light diffraction gratings multiplied by a refractive index difference between the convex and concave portions of the diffraction gratins.

It is desirable that the diffraction grating pitch of the variable diffraction device for use in the optical head apparatus in this embodiment is 10 μm or less so that the diffracted light is restrained to become a stray light, but 5 μm or less is more desirable. If the pitch is set to 3 μm or less, it is particularly desirable that the diffracted light cannot be transmitted through the objective lens. On the contrary, it is desirable that the diffraction grating pitch is set to 0.5 μm or more to form the diffraction gratins easily, 2 μm or more is more desirable in consideration of the manufacturing yield.

In the optical head apparatus in this embodiment, it is further desirable that a ¼ wavelength plate is arranged between the variable diffraction device and the objective lens. According to this constitution, the light source light emitted from the light source 1 is emitted from the variable diffraction device to the ¼ wavelength plate with a linearly-polarized light in the same polarizing direction as the light source 1. The light source light is converted to a circularly polarized light by the ¼ wavelength plate, and irradiated and focused to the information recording surface of optical disk by the objective lens. The return light as converted to the oppositely routed circular polarized light reflected by the information recording surface is transmitted through the objective lens and incident to the ¼ wavelength plate. The return light is then converted to a linear polarized light in the polarizing direction orthogonal to the light source light by the ¼ wavelength plate, and emitted to the variable diffraction device. Therefore, the variable diffraction device is constituted so that the diffraction efficiency is set to high with respect to the linear polarized light in the polarizing direction in the outward path and the diffraction efficiency is set to low with respect to the linear polarized light in the polarizing direction orthogonal to the linear polarized light in the outward path. According to the constitution, the transmission factor of the outward path is varied in response to the type of optical disk and the operation in the writing or reading so that the light source light with the optimal irradiation intensity is irradiated on the optical disk. The return light from the optical disk is transmitted through the variable diffraction device with a constantly high transmission factor, and can be introduced to the light detector with high usage efficiency, so that an optical signal from the optical disk can be detected with high SN ratio.

The optical head apparatus in the invention can carry out stable reading or writing since an electrically floated electrode is not used and time lapse variations caused by the adverse effect of static electricity is not occurred. Further, a cost-cutting is realized since the number of voltage-supplied terminals can be reduced.

While the present invention has been described in detail and with reference to specific embodiments thereof, it will be apparent to one skilled in the art that various changes and modifications can be made therein without departing from the spirit and scope thereof.

The present application is based on Japanese Patent Application No. 2005-248042 filed on Aug. 29, 2005, and the contents thereof are incorporated herein by reference.

What is claimed is:

1. An optical head apparatus comprising:
 a light source emitting a linearly-polarized light;
 an objective lens focusing a light source light emitted from the light source on an optical recording medium;
 a light detector receiving a return light generated by reflecting the light source light by the optical recording medium; and
 a variable diffraction device comprising:
   a first polarized light diffraction grating; and
   a second polarized light diffraction grating,
 the variable diffraction device: diffracting an incident light of the linearly-polarized light by one of the first polarized light diffraction grating and the second polarized light diffraction grating; and transmitting the incident light without diffraction by the other thereof,
 the first polarized light diffraction grating having:
   first stripes comprising an anisotropic transparent material; and
   second stripes comprising an isotropic transparent material,
 the first stripes and the second stripes being alternately arranged in a first direction and in a first pitch to fill each space;
 the second polarized light diffraction grating having:
   third stripes comprising an anisotropic transparent material; and
   fourth stripes comprising an isotropic transparent material, the third stripes and the fourth stripes being alternately arranged in a second direction and in a second pitch to fill each space;

the first polarized light diffraction grating and the second polarized light diffraction grating being different from each other in at least one of their respective pitches and directions, the variable diffraction device being capable of switching:

either the first polarized light diffraction grating or the second polarized light diffraction grating diffracting the incident light; and the other thereof transmitting the incident light without diffraction by changing refractive indices sensed by the first polarized light diffraction grating and the second polarized light diffraction grating with respect to the incident light by an externally applied electric signal, wherein, provided that a polarizing direction diffracted by the first polarized light diffraction grating is defined as a first polarizing direction and a polarizing direction that is orthogonal to the first polarizing direction and not diffracted by the first polarized light diffraction grating is defined as a second polarizing direction, a ratio obtained from dividing a diffraction efficiency in the second polarizing direction by a diffraction efficiency in the first polarizing direction, of the first polarized light diffraction grating, is 0 to 0.5, and a ratio obtained from dividing a diffraction efficiency in the first polarizing direction by a diffraction efficiency in the second polarizing direction, of the second polarized light diffraction grating, is 0 to 0.5.

2. An optical head apparatus comprising:

a light source emitting a linearly-polarized light;

an objective lens focusing a light source light emitted from the light source on an optical recording medium;

a light detector receiving a return light generated by reflecting the light source light by the optical recording medium; and a variable diffraction device comprising:
 a first polarized light diffraction grating; and
 a second polarized light diffraction grating, the variable diffraction device: diffracting an incident light of the linearly-polarized light by one of the first polarized light diffraction grating and the second polarized light diffraction grating; and transmitting the incident light without diffraction by the other thereof, the first polarized light diffraction grating having:
 first stripes comprising an anisotropic transparent material; and
 second stripes comprising an isotropic transparent material, the first stripes and the second stripes being alternately arranged in a first direction and in a first pitch to fill each space;

the second polarized light diffraction grating having:
 third stripes comprising an anisotropic transparent material; and
 fourth stripes comprising an isotropic transparent material, the third stripes and the fourth stripes being alternately arranged in a second direction and in a second pitch to fill each space;

the first polarized light diffraction grating and the second polarized light diffraction grating being different from each other in at least one of their respective pitches and directions, the variable diffraction device being capable of switching:

either the first polarized light diffraction grating or the second polarized light diffraction grating diffracting the incident light; and the other thereof transmitting the incident light without diffraction by changing refractive indices sensed by the first polarized light diffraction grating and the second polarized light diffraction grating with respect to the incident light by an externally applied electric signal, wherein a ratio obtained from dividing a zero-order diffraction efficiency by a primary-order diffraction efficiency, of the first polarized light diffraction grating with respect to the incident light having the first polarizing direction, is 5 to 30, and a ratio obtained from dividing the zero-order diffraction efficiency by the primary-order diffraction efficiency, of the second polarized light diffraction grating with respect to the incident light having the second polarizing direction, is 5 to 30.

3. The optical head apparatus according to claim 1, wherein the variable diffraction device includes a polarized light changing element and a polarized light diffracting element, the polarized light changing element comprises:
 a pair of transparent substrates oppositely arranged each other;
 transparent electrodes formed on opposed surfaces of the pair of transparent substrates; and
 a liquid crystal layer held between the transparent substrates, the polarized light changing element emits a light so that an incident light of linearly-polarized light incident thereto is either rotated by 90 degrees or is not changed in relation to the externally applied electric signal, optical axes of the first stripes and the third stripes are present in a plane of the polarized light diffracting element and define an angle of 90 degrees, the second stripes and the fourth stripes both have a refractive index substantially equal to an ordinary refractive index or an extraordinary refractive index of both of the first stripes and the third stripes.

4. The optical head apparatus according to claim 2, wherein the variable diffraction device includes a polarized light changing element and a polarized light diffracting element, the polarized light changing element comprises:
 a pair of transparent substrates oppositely arranged each other;
 transparent electrodes formed on opposed surfaces of the pair of transparent substrates; and
 a liquid crystal layer held between the transparent substrates, the polarized light changing element emits a light so that an incident light of linearly-polarized light incident thereto is either rotated by 90 degrees or is not changed in relation to the externally applied electric signal, optical axes of the first stripes and the third stripes are present in a plane of the polarized light diffracting element and define an angle of 90 degrees, the second stripes and the fourth stripes both have a refractive index substantially equal to an ordinary refractive index or an extraordinary refractive index of both of the first stripes and the third stripes.

5. An optical head apparatus comprising:
a light source emitting a linearly-polarized light;
an objective lens focusing a light source light emitted from the light source on an optical recording medium;
a light detector receiving a return light generated by reflecting the light source light by the optical recording medium; and
a variable diffraction device comprising:
a first polarized light diffraction grating; and
a second polarized light diffraction grating,
the variable diffraction device: diffracting an incident light of the linearly-polarized light by one of the first polarized light diffraction grating and the second polarized light diffraction grating; and transmitting the incident light without diffraction by the other thereof,
the first polarized light diffraction grating having:
first stripes comprising an anisotropic transparent material; and
second stripes comprising an isotropic transparent material,
the first stripes and the second stripes being alternately arranged in a first direction and in a first pitch to fill each space;
the second polarized light diffraction grating having:
third stripes comprising an anisotropic transparent material; and
fourth stripes comprising an isotropic transparent material,
the third stripes and the fourth stripes being alternately arranged in a second direction and in a second pitch to fill each space;
the first polarized light diffraction grating and the second polarized light diffraction grating being different in at least one of the pitches and the directions,
the variable diffraction device being capable of switching:
either the first polarized light diffraction grating or the second polarized light diffraction grating diffracting the incident light; and
the other thereof transmitting the incident light without diffraction
by changing refractive indices sensed by the first polarized light diffraction grating and the second polarized light diffraction grating with respect to the incident light by an externally applied electric signal;
wherein the first stripes and the third stripes comprise a liquid crystal layer, and the liquid crystal layer is enable to change a refractive index with respect to the incident light from a first refractive index $n_b$ to a second refractive index $n_a$ by the externally applied electric signal, and
the second stripes have a refractive index of $n_b$ to $(n_b+0.4 \times \Delta n)$ at a room temperature, and the fourth stripes have a refractive index of $(n_a-0.4 \times \Delta n)$ to $(n_a-0.1 \times \Delta n)$ at room temperature, provided that $n_a$ is larger than $n_b$ and a difference between the second refractive index $n_a$ and the first refractive index $n_b$ is defined as $\Delta n$.

6. The optical head apparatus according to claim 5, wherein the first pitch and the second pitch are 0.5 to 10 μm.

7. A variable diffraction device being capable of changing a diffraction efficiency, the variable diffraction device comprising:
a first polarized light diffraction grating; and
a second polarized light diffraction grating,
the variable diffraction device: diffracting an incident light of the linearly-polarized light by one of the first polarized light diffraction grating and the second polarized light diffraction grating; and transmitting the incident light without diffraction by the other thereof,
the first polarized light diffraction grating having:
first stripes comprising an anisotropic transparent material; and
second stripes comprising an isotropic transparent material,
the first stripes and the second stripes being alternately arranged in a first direction and in a first pitch to fill each space;
the second polarized light diffraction grating having:
third stripes comprising an anisotropic transparent material; and
fourth stripes comprising an isotropic transparent material,
the third stripes and the fourth stripes being alternately arranged in a second direction and in a second pitch to fill each space;
the first polarized light diffraction grating and the second polarized light diffraction grating being different from each other in at least one of their respective pitches and directions,
the variable diffraction device being capable of switching:
either the first polarized light diffraction grating or the second polarized light diffraction grating diffracting the incident light; and
the other thereof transmitting the incident light without diffraction by changing refractive indices sensed by the first polarized light diffraction grating and the second polarized light diffraction grating with respect to the incident light by an externally applied electric signal;
wherein the first stripes and the third stripes comprise a liquid crystal layer, and the liquid crystal layer is enable to change a refractive index with respect to the incident light from a first refractive index $n_b$ to a second refractive index $n_a$ by the externally applied electric signal, and
the second stripes have a refractive index of $n_b$ to $(n_b+0.4 \times \Delta n)$ at a room temperature, and the fourth stripes have a refractive index of $(n_a-0.4 \times \Delta n)$ to $(n_a-0.1 \times \Delta n)$ at room temperature, provided that $n_a$ is larger than $n_b$ and a difference between the second refractive index $n_a$ and the first refractive index $n_b$, is defined as $\Delta n$.

* * * * *